United States Patent
Braun et al.

(10) Patent No.: US 7,890,114 B2
(45) Date of Patent: Feb. 15, 2011

(54) TELECOMMUNICATION SYSTEM WITH TRANSMIT AND MULTI-USER DIVERSITY

(75) Inventors: Volker Braun, Stuttgart (DE); Cornelis Hoek, Tamm (DE)

(73) Assignee: Samsung Electronics Co., Ltd., Seoul (KR)

( * ) Notice: Subject to any disclaimer, the term of this patent is extended or adjusted under 35 U.S.C. 154(b) by 1157 days.

(21) Appl. No.: 10/663,772

(22) Filed: Sep. 17, 2003

(65) Prior Publication Data

US 2004/0063437 A1  Apr. 1, 2004

(30) Foreign Application Priority Data

Sep. 27, 2002 (EP) .................................. 02360277

(51) Int. Cl.
*H04W 72/00* (2009.01)
(52) U.S. Cl. ...................... 455/450; 370/431; 370/464; 370/329; 455/451; 455/452.1; 455/452.2
(58) Field of Classification Search .................. 370/342, 370/310, 431, 464, 329; 455/450, 509, 451, 455/452.1, 452.2, 463, 464
See application file for complete search history.

(56) References Cited

U.S. PATENT DOCUMENTS

| | | | | |
|---|---|---|---|---|
| 5,613,200 | A * | 3/1997 | Hamabe | 455/450 |
| 6,449,484 | B1 * | 9/2002 | Grubeck et al. | 455/450 |
| 6,763,237 | B1 * | 7/2004 | Katz | 455/450 |
| 2002/0145988 | A1 * | 10/2002 | Dahlman et al. | 370/335 |
| 2003/0045288 | A1 * | 3/2003 | Luschi et al. | 455/434 |
| 2003/0210668 | A1 * | 11/2003 | Malladi et al. | 370/335 |

FOREIGN PATENT DOCUMENTS

| EP | 1 211 820 A | 6/2002 |
|---|---|---|
| EP | 0 741 465 B1 | 9/2005 |

OTHER PUBLICATIONS

Hiramatsu et al. Transmit diversity applied on the CDMA/TDD cellular system, Publication Date: May 15-18, 2000.*
Thomas Hedberg et al, "Evolving WCDMA", Ericsson Review, 'Online! No. 3, 2001, pp. 124-131, XP002228837.
"3rd Generation Partnership Project (3GPP); Technical Specification Group Radio Access Network; UTRA High Speed Downlink Packet Access; Release 4; TR 25.950 V 4.0.0", 3GPP TR 25.950 V4.0.0, XX, XX, Mar. 2001, pp. 1-27, XP002213178.
U.S. Appl. No. 10/648,447, filed Aug. 27, 2003, entitled "Telecommunication System with Transmit and Multi-User" by Volker Braun et al.

* cited by examiner

*Primary Examiner*—Patrick N Edouard
*Assistant Examiner*—Aung Win
(74) *Attorney, Agent, or Firm*—Sughrue Mion, PLLC

(57) ABSTRACT

The present invention relates to a method of sending first and second signals to a plurality of user equipments, the method comprising the steps of providing of a dedicated channel for each one of the plurality of user equipments, providing of a code-multiplexed shared channel for the plurality of user equipments, assigning of an antenna of a set of antennas to each one of the user equipments, sending of one of the first signals to one of the plurality of user equipments on one of the dedicated channels on a carrier frequency by applying transmit diversity, sending of one of the second signals to one of the plurality of user equipments on the code-multiplexed shared channel on the carrier frequency by applying multi-user diversity.

10 Claims, 10 Drawing Sheets

TELECOMMUNICATION SYSTEM WITH TRANSMIT AND MULTI-USER DIVERSITY

FIELD OF THE INVENTION

The present invention generally relates to telecommunications, and more particularly, to transmit and multi-user diversity in a cellular mobile telecommunication system. The invention is based on a priority application EP 02 360 277.4 which is hereby incorporated by reference.

BACKGROUND AND PRIOR ART

The demand for data communication services has exploded with the acceptance and widespread use of the Internet. While data communications have historically been serviced via wired connections, wireless users are now demanding that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices.

Significant performance issues exist when using a wireless network to service data communications. Wireless networks were initially designed to service the well-defined requirements of voice communications. Generally speaking, voice communications require a sustained bandwidth with minimum signal-to-noise ratio (SNR) and continuity requirements. Data communications, on the other hand, have very different performance requirements. Data communications are typically bursty, discontinuous, and may require a relatively high bandwidth during their active portions.

The wireless network infrastructure must support both low bit rate voice communications and the varying rate data communications. More particularly, the network infrastructure must transmit low bit rate, delay sensitive voice communications together with high data rate, delay tolerant rate data communications.

It is therefore desirable to provide a communication system that is capable of carrying both delay sensitive lower data rate voice communications and delay tolerant higher data rate data communications with minimal waste of spectral capacity. Further, it is also desirable to provide a communication system that also services bursty data traffic for a plurality of data users without wasting allocated spectrum.

One example of such a communication system is the Universal Mobile Telecommunications System (UTMS) Terrestrial Radio Access Network (UTRAN). The UTRAN is a third generation system which in some respects builds upon the radio access technology known as Global System for Mobile communications (GSM). UTRAN is a wideband code division multiple access (W-CDMA) system.

A goal of the Third Generation Partnership Project (3GPP) is to evolve further the UTRAN and GSM-based radio access network technologies. Of particular interest here is the support of variable transmission rate services in the third generation mobile radio communications system for both real time and non-real time delay tolerant services. Because users share the same radio resources, the radio access network must carefully allocate resources to individual user equipment (UE) connections based on quality of service requirements, such as variable rate services, and on the availability of radio resources.

For example, in a multimedia session, one bearer may carry a speech connection, another bearer carries a video connection, and a third bearer may carry a packet data connection. Connections are mapped by the UTRAN onto physical transport channels.

Between the UE and the UTRAN, a connection may be mapped to one or more dedicated transport channels (DCHs) or to a common transport channel such as a random access common channel (RACH), a forward access common channel (FACH), a common packet channel (CPCH), a downlink shared channel (DSCH), and a high speed-downlink shared channel (HS-DSCH).

Real time connections are mapped to dedicated channels. On a dedicated channel, resources may be guaranteed to provide a particular service, such as a minimum transmission rate for voice communications.

To provide effective multimedia capabilities in UMTS, the High-Speed Downlink Packet Access (HSDPA) scheme is being developed which facilitates transfer of packet data to a mobile station at up to e.g. 4 Mbps.

The concept of HSDPA has been recently standardized in 3GPP for UMTS. It considers enhancements that can be applied to UTRA to provide very high-speed downlink packet access by means of a high-speed downlink shared channel (HS-DSCH).

For the basic structure of HS-DSCH two architectures have been considered (R2A010010: HSDPA radio interface protocol architecture', Ericsson, Motorola), i.e. an RNC-based architecture consistent with R99 architecture and a node B-based architecture for scheduling. Moving the scheduling to the nodes B enables a more efficient implementation of scheduling by allowing the scheduler to work with the most recent channel information. The scheduler can adapt the modulation to better match the current channel conditions and fading environment. Morever, the scheduler can exploit the multi-user diversity by scheduling only those users in constructive fades.

To improve transmission in a fading environment diversity techniques based on the use of multiple downlink transmit antennas are well known. Second order applications of these have been applied in the UTRA R99 specifications. Such techniques exploit spatial and/or polarisation decorrelations over multiple channels to achieve fading diversity gains.

Multiple input multiple output (MIMO) processing employs multi antennas at both the base station transmitter and terminal receiver, providing several advantages over transmit diversity techniques with multiple antennas only at the transmitter and over single antennas systems. If multiple antennas are available at both the transmitter and the receiver, the peak throughput can be increased using a technique known as code re-use.

It is an object of the present invention to provide an improved transmit diversity technique, in particular for usage in HSDPA-type systems.

SUMMARY OF THE INVENTION

The invention enables to send both real time and non-real time signals to user equipment of a mobile cellular telecommunication system by applying transmit diversity at least to the real time signals while making efficient usage of the available transmission power. This is accomplished by providing of dedicated channels for each one of the user equipments for the purpose of transmitting real time signals, such as voice and/or video signals. Preferably diversity techniques based on the use of multiple downlink transmit antennas are applied to these dedicated channels.

Further a code-multiplexed shared channel is provided for the user equipments. The active user equipments are split into two groups one of which is assigned to a first antenna and one of which is assigned to a second antenna. Non-real time signals which need to be sent to the first group are amplified by the power amplifier coupled to the first antenna and sent out from the first antenna; likewise non-real time signals to be sent out to the second group are amplified by the power amplifier connected to the second antenna and sent out from the second antenna.

In the more general case n-transmit diversity is applied, for example n=4. In this case the user equipments are split into a number of n=4 groups which are assigned to corresponding antennas.

In accordance with a further preferred embodiment of the invention a scheduler is used to exploit the multi-user diversity by scheduling only those users in constructive fades.

In accordance with a further preferred embodiment of the invention an improved transmit diversity technique is provided which enables to make efficient usage of the total available transmission power of the power amplifiers, in particular for providing both real time and non-real time services. In a preferred application of the present invention real time signals, such as voice and/or video signals, are sent out by applying a transmit diversity technique with multiple power amplifiers and multi antennas. Each of the power amplifiers supports at least two carrier frequencies. The real time signals are split up into a group of signals which are sent on the first carrier frequency and into another group of signals which are sent on the second carrier frequency.

Non-real time signals are scheduled in order to exploit multi-user diversity by scheduling only those users in constructive fades. Because of this kind of scheduling no transmit diversity is required. In order to make symmetric usage of the power amplifiers the active user equipments within the cell are split into a group which is assigned to the first transmission frequency and into another group which is assigned to the second transmission frequency. Non-real time signals which are to be sent to the first group of user equipments are amplified by the first power amplifier and non-real time signals to be sent to the second group are amplified by the second power amplifier. Hence, in average the usage of the power amplifiers is about symmetric and efficient usage of the total available transmission power is made.

In accordance with a preferred embodiment of the invention the real time signals are transmitted over DPCHs and the non-real time signals over a shared HS-DSCH of a HSDPA system. The real time signals are transmitted on the DPCHs using transmit diversity and each of the non-real time signals is transmitted over HS-DSCH over only one of the transmission antennas without transmit diversity but applying multi-user diversity. This way statistical balancing of transmission power can be achieved by using multi-carrier power amplifiers.

In accordance with a further preferred embodiment of the invention more than two carrier frequencies are used. The multi-carrier power amplifiers needs to support these carrier frequencies. To obtain statistical balancing of the usage of the transmission power of the power amplifiers the number of carrier frequencies must be equal to the number of diversity branches. For example, instead of a two transmit diversity scheme with a two-carrier power amplifier a four-transmit diversity scheme with a four-carrier power amplifier can be used.

In accordance with a further preferred embodiment of the invention each user equipment is assigned to both one of the set of carrier frequencies and one of the antennas of the set of antennas. Further each of the dedicated channels is assigned to one of the set of carrier frequencies.

In accordance with a further preferred embodiment of the invention closed loop transmit diversity is applied to the non-real time signals in addition to the multi-user diversity.

BRIEF DESCRIPTION OF THE DRAWINGS

In the following preferred embodiments of the invention will be described in greater detail by making reference to the drawings in which.

DETAILED DESCRIPTION

Figure 1:
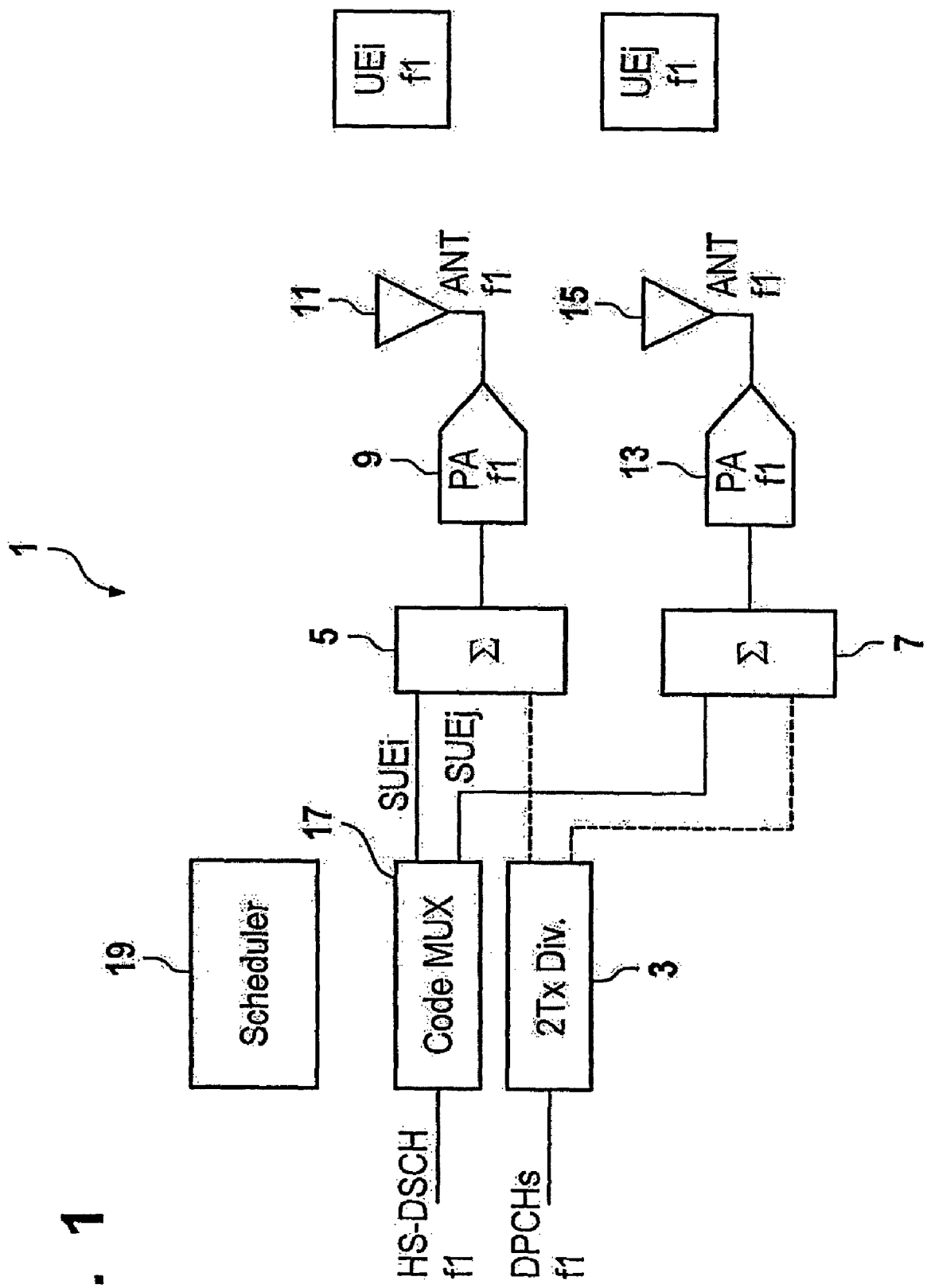
FIG. 1 is a block diagram of a first embodiment of a telecommunication system of the invention based on a single carrier frequency.

FIG. 1 shows a block diagram of a telecommunication system having a transmitter 1 for servicing of a plurality of user equipments UEi, UEj, . . . within a cell of a mobile telecommunication system. The transmitter 1 has a transmit diversity module 3 for applying of transmit diversity to DPCHs. The outputs of the transmit diversity module 3 are coupled to adders 5 and 7, respectively. Adder 5 is coupled to signal carrier amplifier 9, which is coupled to antenna 11. Likewise adder 7 is coupled to power amplifier 13 which is coupled to antenna 15.

Further transmitter 1 has code multiplexer 17 for code multiplexing of HS-DSCH. Code multiplexer 17 provides at its output signal components SUEi and SUEj, . . . for the respective user equipments UEi, UEj, . . . .

Each one of the user equipments UEi, UEj, . . . is assigned to one of the antennas 11 or 15. For example the user equipment UEi is assigned to the antenna 11 and the user equipment UEj is assigned to the antenna 15. The outputs of code multiplexer 17 are coupled to the respective adders 5 and 7. This way the signal component SUEi is provided to adder 5 and the signal component SUEj is provided to adder 7.

Scheduler 19 schedules the sending of non-real time signals via HS-DSCH in order to provide multi-user diversity by scheduling only those users in constructive fades.

By splitting the user equipments into groups which are assigned to different antennas the loading of the power amplifiers 9 and 13 is approximately symmetric even though only for DPCHs transmit diversity is applied.

Figure 2:
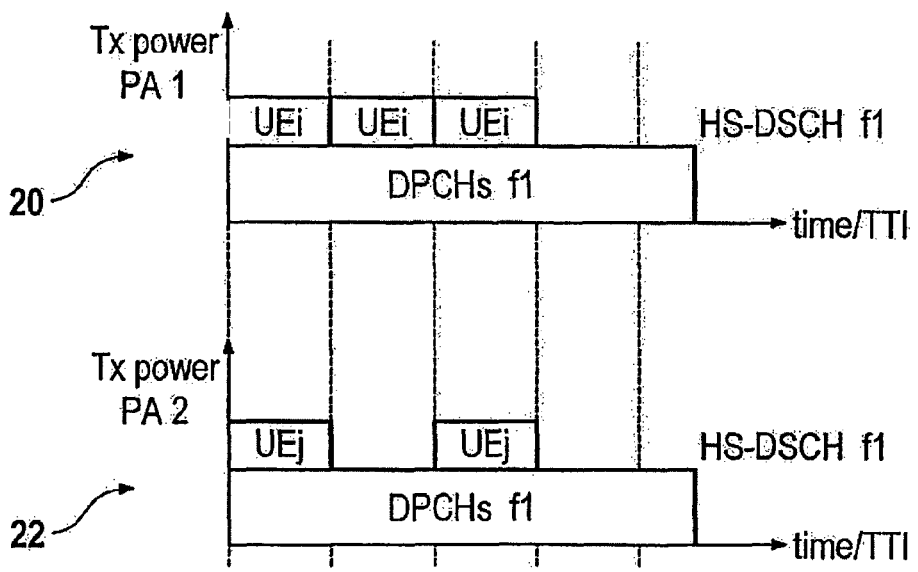
FIG. 2 is illustrative of a diagram showing the usage of the power amplification capacity.

The statistical balancing of the utilisation of the total available transmission power is illustrated by way of example in FIG. 2. FIG. 2 shows diagrams 20 and 22 illustrating the utilisation of the transmission power of power amplifiers 9 and 13 of FIG. 1, respectively, in the time domain. The time axis is divided into scheduling intervals, which are referred to as transmission time intervals (TTI) in UTRA notation. As it is apparent from FIG. 2 most of the time both power amplifiers 110 and 112 are operated at or close to their respective maximum power output capability.

Figure 3:
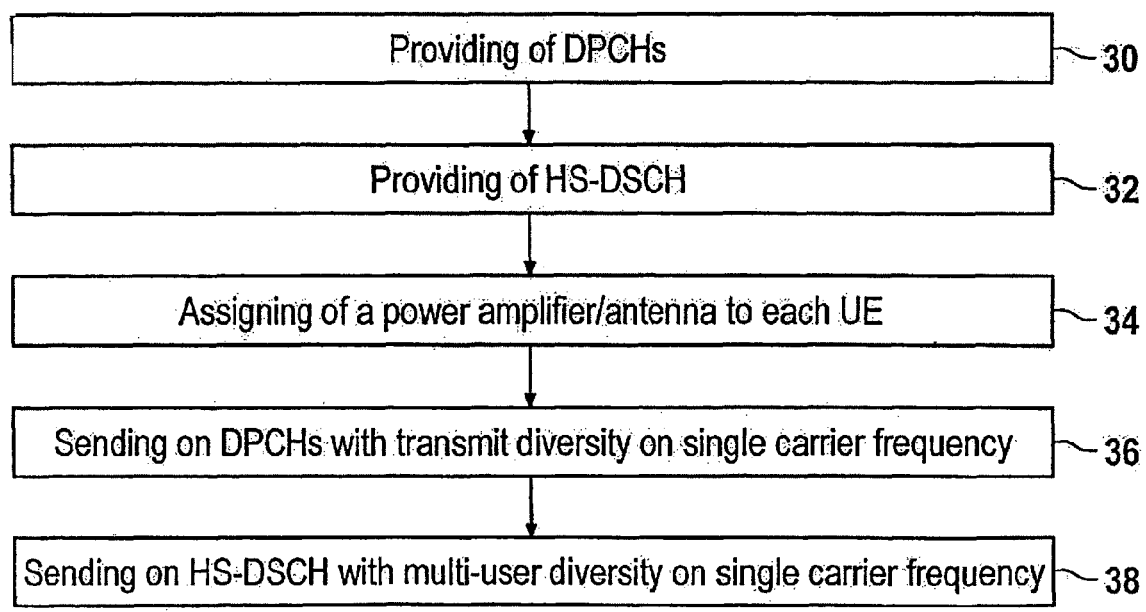
FIG. 3 is illustrative of a flow chart for operating the telecommunications system of FIG. 1

FIG. 3 shows a corresponding flow chart. In step 30, DPCHs are provided. In step 32 a shared HS-DSCH is provided. In step 34 an antenna and an associated power amplifier is assigned to each active user equipment. Preferably about the same number of user equipments is assigned to each one of the antennas. This can be done by an appropriate signalling scheme between the transmitter and the user equipments.

In step 36 real time signals are sent on the DPCHs with transmit diversity on a single carrier frequency. In step 38 non-real time signals are sent on HS-DSCH with multi-user diversity on the single carrier frequency. No transmit diversity needs to be applied because of the multi-user diversity.

Each active user equipment preferably monitors the channel quality for either of the propagation channels, and it reports the quality of the best channel to node B. In addition also the transmission antenna associated with the channel quality feedback is reported to node B. Different user equipments that are addressed in code multiplex can be addressed via different transmission antennas. For example a first code is transmitted via antenna 11 (cf. FIG. 1) to the assigned user equipment UEi and a second code is transmitted via antenna 15 to the assigned UEj.

It is to be noted that this embodiment is particularly advantageous as the probability that a user equipment 'sees' a good channel is relatively high. Further cross-talk from Hadamard codes associated with other user equipment is reduced since the corresponding channels seen weaker by the addressed user equipment.

Preferably node B should balance the Hadamard codes between the transmission antennas such that the transmit power is well balanced. Further, due to a limited load balancing within each carrier, support of a flexible number of carriers is generally possible, e.g. single-carrier or three-carrier operation.

Figure 4:
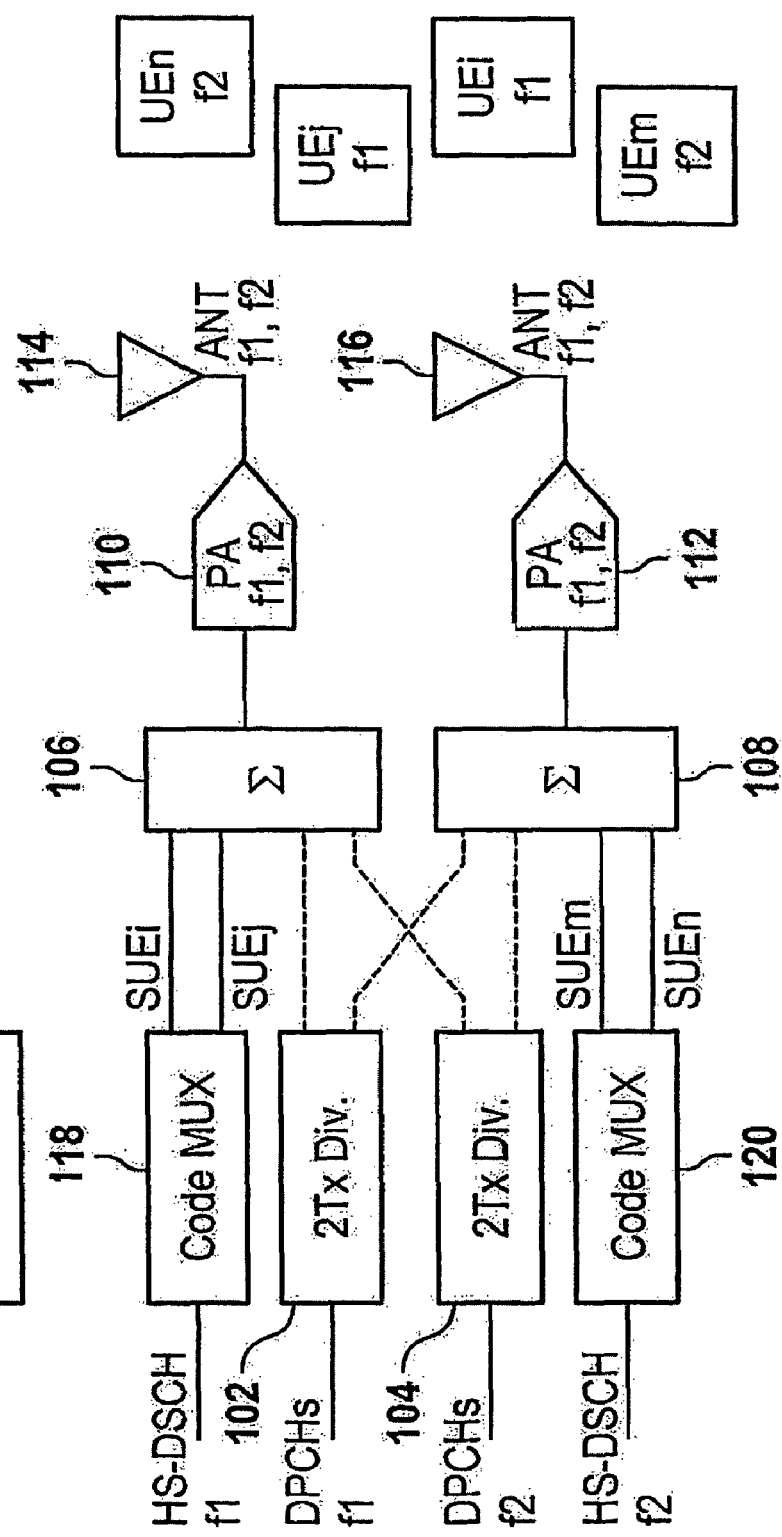
FIG. 4 is a block diagram of a second preferred embodiment of a telecommunications system of the invention using at least first and second carrier frequencies.

FIG. 4 shows a block diagram of a telecommunication system for servicing a number of mobile user equipments (UEs). By way of example the user equipments UEn UEj UEi and UEm are shown in the block diagram of FIG. 4; it needs to be noted that in a practical application there can be many more UEs.

Each of the UEs is assigned to a first transmission frequency f1 or a second transmission frequency f2. For example UEn is assigned to f2, UEj is assigned to f1, UEi is assigned to f1 and UEm is assigned to f2. This way the UEs are split into a first group of UEs which are assigned to the first carrier frequency f1 and into a second group which is assigned to the second carrier frequency f2.

Preferably the assignment of carrier frequencies to UEs is performed by appropriate signalling between the UEs and the transmitter 100 of the telecommunication system. For example carrier frequencies are assigned to UEs which become active alternatingly. For example the UEs become active in the following sequence:

UEi, UEn UEj, UEm, . . . .

The first UE which becomes active, i.e. UEi, is assigned to the first carrier frequency f1. The second UE which becomes active, i.e. UEn is assigned to the second carrier frequency f2. The next UE which becomes active, i.e. UEj, is assigned to the first carrier frequency f1, and so on. This way the two groups of UEs results, where each group comprises about the same number of UEs if a larger number of UEs is considered.

Preferably the assignment of UEs to frequencies is performed in order to balance the load of the power amplifiers. It is to be noted that this assignment can be dynamic and that FIG. 1 is to be understood as a snap shot.

The transmitter 100 serves to transmit both real time and non-real time signals to the UEs. Real time signals, such as voice or video signals, are transmitted via DPCHs. Each of the DPCH's is assigned to either the first carrier frequency f1 or to the second carrier frequency f2. In order to provide transmit diversity for the DPCHs the transmitter 100 has transmit diversity modules 102 and 104.

Transmit diversity module 102 receives real time signals which are to be transmitted on a DPCH being assigned to the frequency f1. Likewise transmit diversity module 104 receives such real time signals which are to be transmitted on DPCHs being assigned to the second carrier frequency f2.

Transmit diversity module 102 is coupled via adders 106 and 108 to power amplifiers 110 and 112, respectively. Both power amplifiers 110 and 112 are dual-carrier power amplifiers which support the carrier frequencies f1 and f2. Power amplifier 110 is coupled to antenna 114 and power amplifier 112 is coupled to antenna 116. This way any known diversity technique based on the use of multiple downlink transmit antennas can be implemented.

For the HS-DSCH the transmitter has code multiplexes 118 and 120. Code multiplexer 118 has an input for receiving of non-real time signals to be sent to the first group of UEs, i.e. to UEs which are assigned to the second carried frequency f2. This way the signal components SUEi, SUEj, . . . to be transmitted on carrier frequency f1 and the signal components SUEm, SUEn, . . . to be transmitted on carrier frequency f2 are provided by the code multiplexes 118 and 120, respectively. The signal components SUEi, SUEj, . . . which are to transmitted on carrier frequency f1 are input into adder 106. Likewise the signal components SUEm, SUEn, . . . are input into adder 108.

Further the transmitter 100 has scheduler 124. Scheduler 124 schedules the non-real time signals to be sent over HS-DSCH in order to provide multi-user diversity by scheduling only non-real time signals to users in constructive fades.

In operation, the power amplifier 110 is controlled to amplify the real time signals of the DPCHs being assigned to the frequency f1 on carrier frequency f1 and the real time signal components of the DPCHs assigned to the carrier frequency of f2 on frequency f2. The signal components SUEi, SUEj, . . . of HS-DSCH to be sent on carrier frequency f1 are only amplified by power amplifier 110 on carrier frequency f1. The same principle applies correspondingly to the operation of power amplifier 112.

Figure 5:
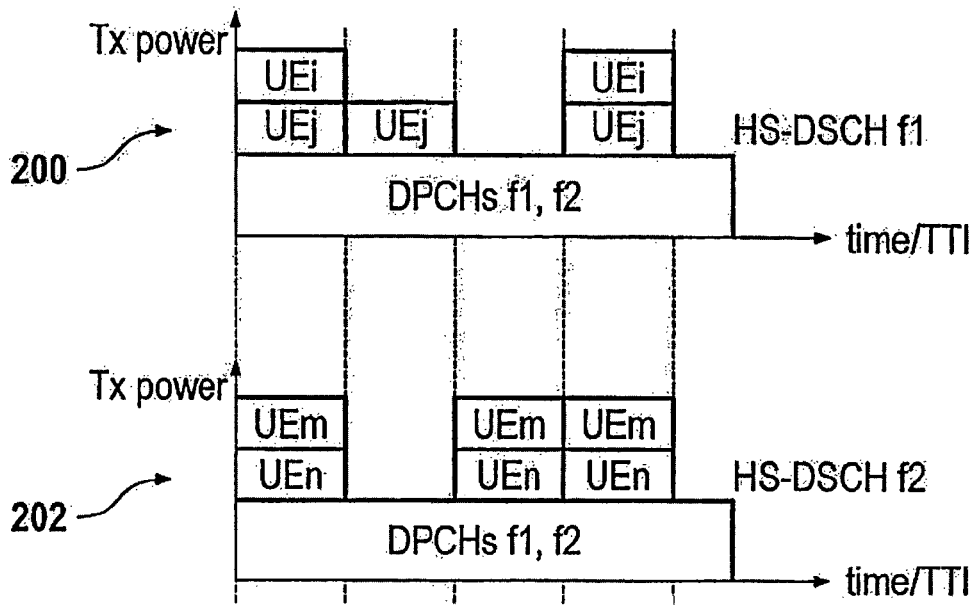
FIG. 5 is illustrative of is illustrative of the statistical utilisation of the transmission power capacities of the dual carrier power amplifiers of the system of FIG. 4.

The statistical balancing of the utilisation of the total available transmission power is illustrated by way of example in FIG. 5. FIG. 5 shows diagrams 200 and 202 illustrating the utilisation of the transmission power of power amplifiers 110 and 112 of FIG. 1, respectively, in the time domain. The time axis is divided into scheduling intervals, which are referred to as transmission time intervals (TTI) in UTRA notation. As it is apparent from FIG. 5 most of the time both power amplifiers 110 and 112 are operated at or close to their respective maximum power output capability.

Figure 6:
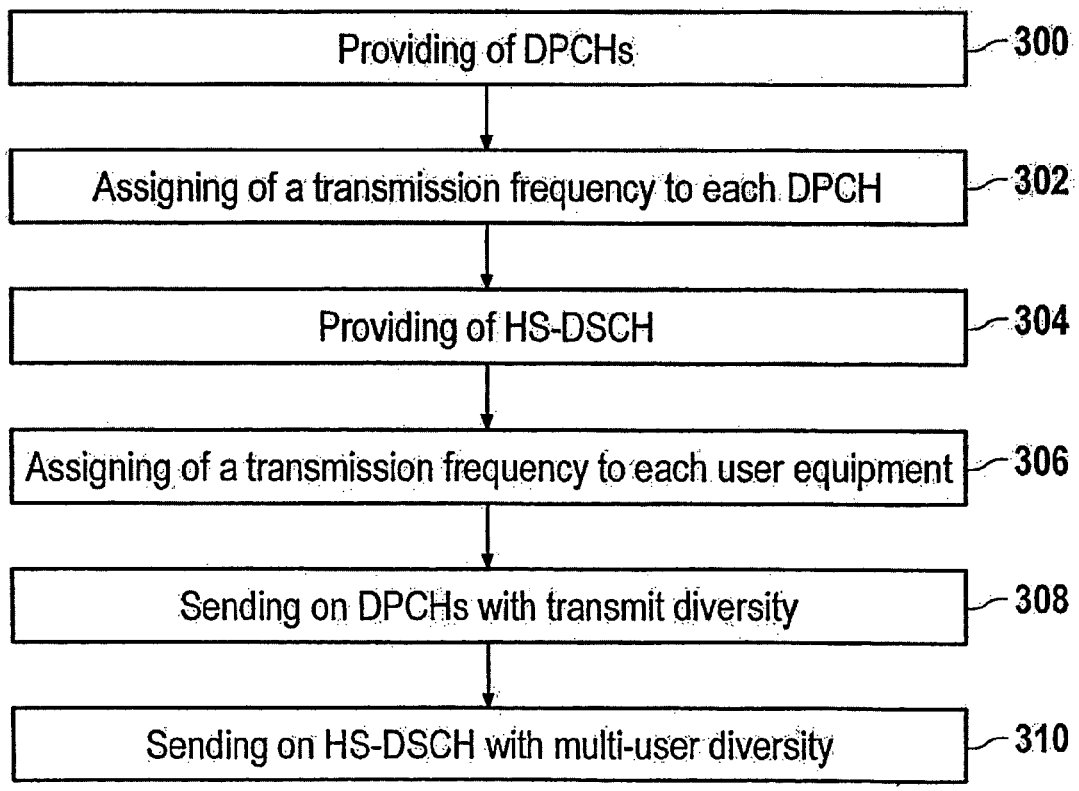
FIG. 6 is illustrative of a flow chart of a preferred embodiment of a method of the invention

FIG. 6 illustrates an embodiment of a method of the invention by way of example. In step 300 DPCHs are provided for transmitting of real time signals. A transmission frequency of a set of transmission frequencies is assigned to each one of the DPCHs in step 302.

In step 304 a HS-DSCH is provided as a shared channel for transmitting of non-real time signals. In step 306 a transmission frequency of the set of transmission frequencies is assigned to each active UE within the cell. This is done by an appropriate signalling protocol. When the UEs are capable to receive only one carrier frequency this step is not required as the carrier frequency has already been assigned in step 302. In this instance the carrier frequency assigned in step 302 to a UE will also be used for the HS-DSCH transmission to that UE.

In step 308 the real time signals are sent on the DPCHs with transmit diversity. In step 310 the non-real time signals are sent on the shared HS-DSCH with multi-user diversity but without transmit diversity. Due to the assignment of transmission frequencies to user equipment in step 306 a statistical balancing of the utilisation of the power amplifiers is accomplished.

Figure 7:
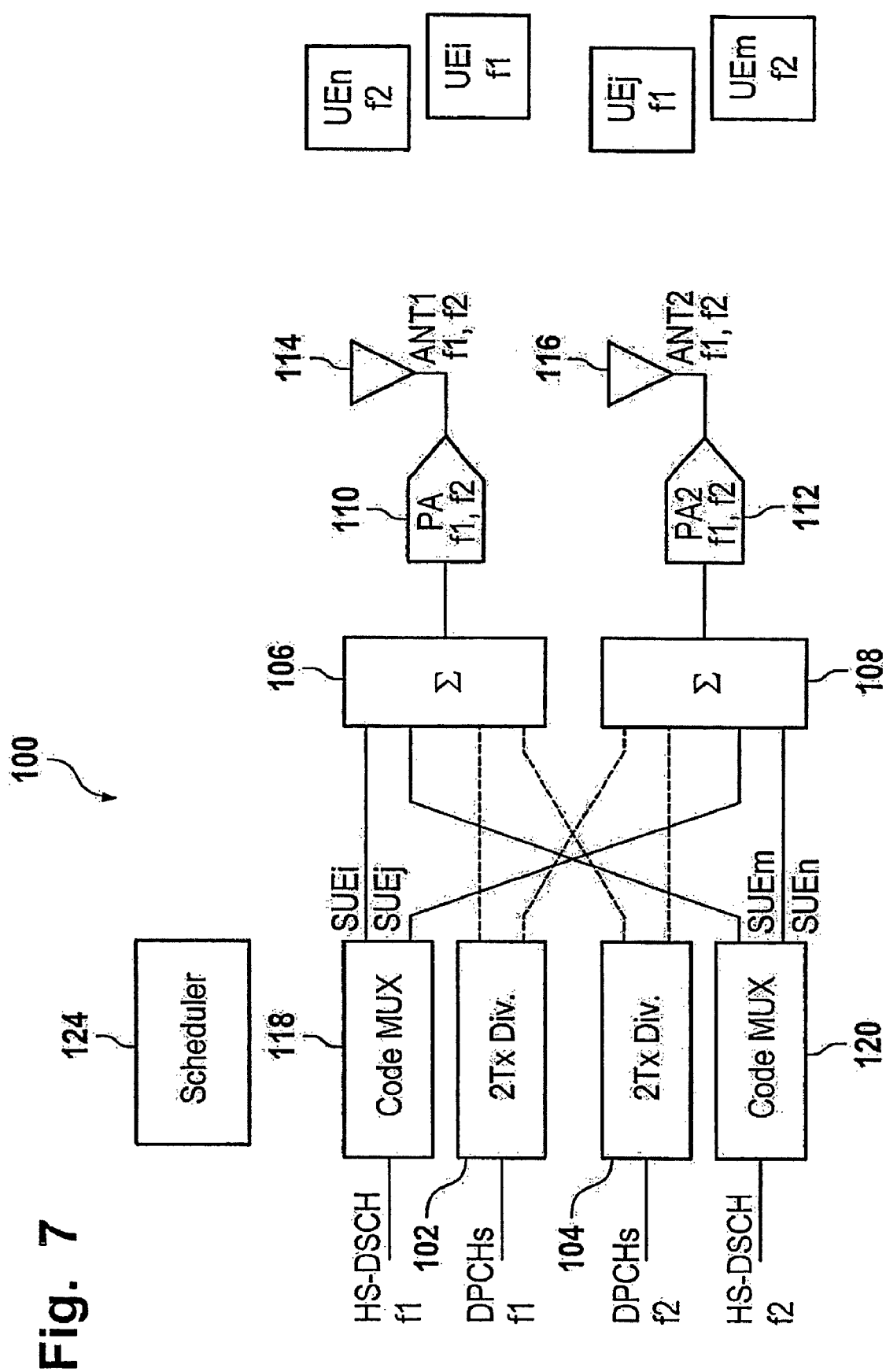
FIG. 7 is illustrative of a third preferred embodiment of a telecommunication system.

FIG. 7 shows a further preferred embodiment which combines the embodiments of FIGS. 1 to 3 and 4 to 6. Like elements in the embodiment of FIG. 7 are designated with the same reference numerals as in the embodiment of FIG. 4.

As opposed to the embodiment of FIG. 4 each user equipment is not only assigned to one of the available carrier frequencies f1, f2 but also to one of the antennas 110, 112. The assignment of user equipments to antennas is done as in the embodiment of FIGS. 1 to 3. This way the advantages of both embodiments are combined.

The multi-carrier operation on frequencies f1 and f2 further improves the power amplifier load balancing. In this instance, load or Hadamard code balancing can be performed jointly for all the carriers, i.e. joint multi-carrier scheduling. This has the further advantage that heavy peak loads can be avoided by means of a single-carrier or multi-carrier scheduling technique. Packets which are addressed to slowly moving user equipments are delayed in order to avoid peak loads. Such a technique can also be employed for the other preferred embodiments.

Figure 8:
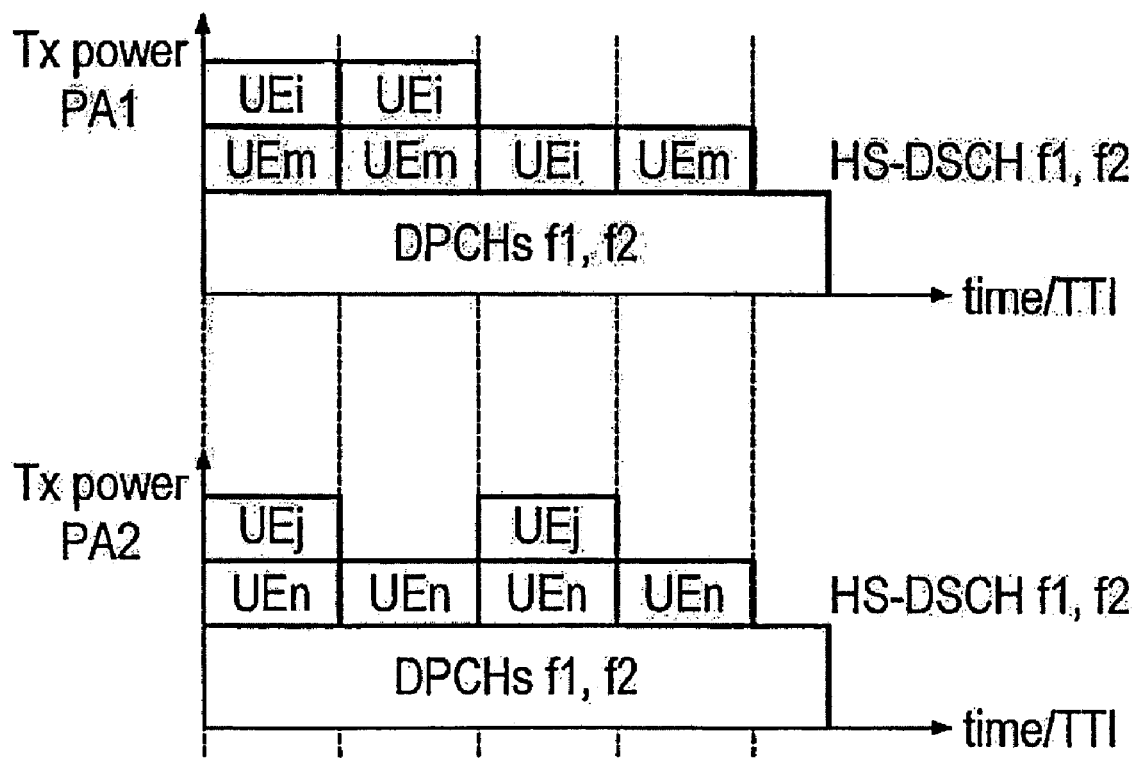
FIG. 8 is illustrative of is illustrative of the statistical utilisation of the transmission power capacities of the dual carrier power amplifiers of the system of FIG. 7.

The corresponding time domain characteristic is shown in FIG. 8.

Figure 9:
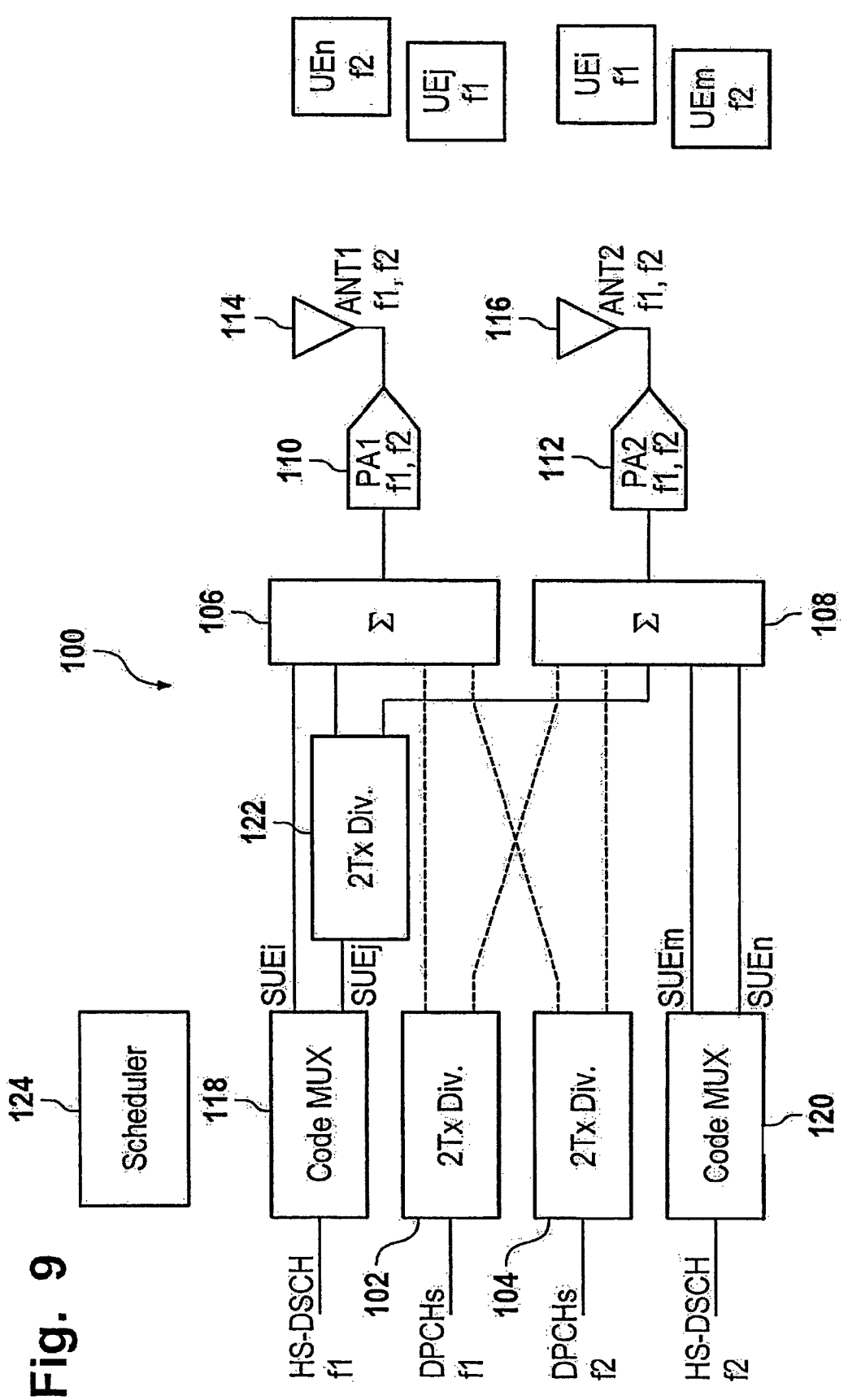
FIG. 9 is illustrative of a fourth preferred embodiment.

FIG. 9 shows a block diagram of a further preferred embodiment. Like elements of the embodiment of FIG. 9 are designated with the same reference numerals as in the embodiments of FIGS. 4 and 7.

The embodiment of FIG. 9 is similar to the embodiment of FIG. 7. In addition to the embodiment of FIG. 7 closed loop transmit diversity is applied for HS-DSCH on good channels. Preferably this scheme is used only if the DPCH associated with the HS-DSCH is transmitted using closed loop transmit diversity, where generally any closed loop transmit diversity mode can be used, for example R99 closed loop transmits diversity mode 1 or mode 2. This scheme can be combined with any of the above disclosed preferred embodiments, e.g. HS-DSCH transmission via one antenna or using antenna selection.

In the example considered here two-transmit diversity is applied. Each of the user equipments monitors the channel quality for either of the propagation channels. If both channels seen by the user equipment are good, then the user equipment indicates to node B that closed loop diversity shall be used on the HS-DSCH. This means that the HS-DSCH transmission is performed via two different transmission antennas.

In this case the channel quality feedback shall include the anticipated and/or experienced beam forming gain obtained after combing in the user equipment. In the four-transmit diversity case closed loop transmit diversity could be applied with a flexible number of transmission antennas, for example if two (three/four) out of four propagation seen by the user equipment are good, then apply two-transmit (three-transmit/four-transmit) closed loop diversity.

It is to be noted that if HS-DSCH is transmitted using closed loop transmit diversity, then HS-DSCH should typically use the same antenna weights as the associated DPCH. In general, however, both HS-DSCH and the associated DPCH could also use different antenna weights.

As compared with the above described embodiments increased system throughput can be expected, particularly at low terminal velocities. This throughput increase is due the coherent combining gain of up to 3 db in the two-transmit diversity case. This is obtained by using closed loop transmit diversity in the case that more than one channel seen by the user equipment are good.

Coherent combining results in a directed transmission, similar as with beam steering. Therefore also the interference caused to other terminals can be reduced. Further this embodiment is particularly advantageous as the power amplifier load balancing can be further improved.

In the preferred embodiment of FIG. 9 the closed loop transmit diversity scheme is combined with the scheme of FIG. 4, i.e. HS-DSCH is either transmitted via one antenna, or, if the user equipment sees several good channels, using closed loop transmit diversity. This way a coherent combining gain can be obtained with little additional signalling overhead. In the two-transmit diversity case, the additional signalling from a certain user equipment to node B is confined to switching close loop transmit diversity on/off. This way transmit diversity can be applied to HS-DSCH in addition to the multi-user diversity in order to take advantage of the presence of several good channels. This transmits diversity for the HS-DSCH is provided by transmit diversity module 122 of transmitter 100 of FIG. 9.

Figure 10:
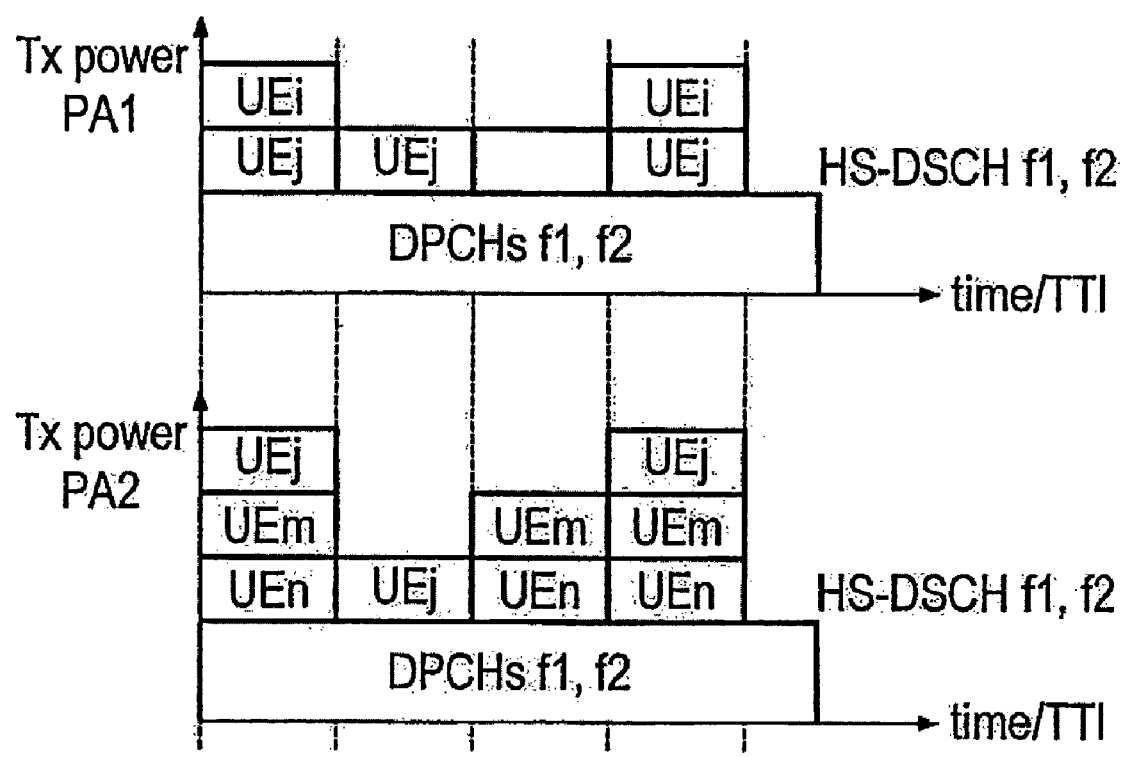
FIG. 10 is illustrative of is illustrative of the statistical utilisation of the transmission power capacities of the dual carrier power amplifiers of the system of FIG. 9

The corresponding time domain characteristic is shown in FIG. 10.

Figure 11:
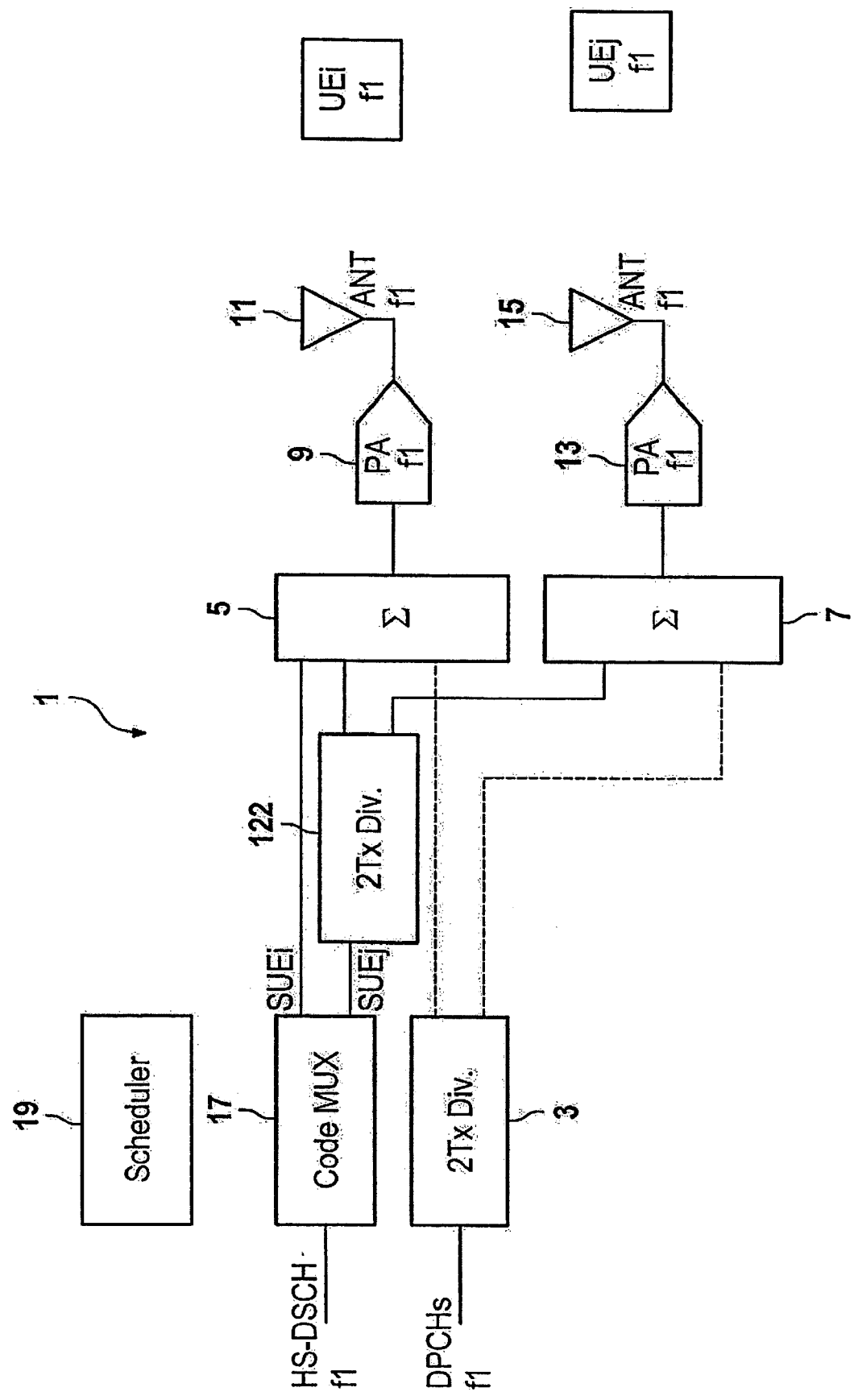
FIG. 11 is illustrative of a fifth preferred embodiment of the invention.

FIG. 11 shows a block diagram of a further preferred embodiment combing the additional transmit diversity for HS-DSCH with the embodiment of FIG. 1. Like reference numerals are used in FIG. 11 to designate like elements. The transmitter 1 of FIG. 11 in addition has a transmit diversity module 122 in order to provide 2-transmit diversity for HS-DSCH. In this case, the transmission alters between an antenna selection mode and a closed loop transmit diversity mode, depending on the quality of the propagation channels. In the example considered here, 2-transmit diversity is assumed. If a user equipment sees a bad channel, antenna selection is used. In this case the user equipment reports the quality of the best channel to node B. In addition, also the transmit antenna associated with the channel quality feedback is reported to node B. If both channels seen by the user equipment are good, user equipment signals to node B that closed loop transmit diversity shall be used for HS-DSCH transmission.

In the preferred embodiment considered here with respect of FIG. 11 the single-carrier operation is illustrated. In the 4-transmit diversity case, closed loop transmit diversity can be applied with a flexible number of transmitter antennas.

In the example considered with respect to FIG. 11 UEi only sees one good channel and therefore uses antenna selection. As opposed to this the user equipment UEj sees two good channels and therefore uses 2-transmit closed loop diversity by means of transmit diversity module 122.

Figure 12:
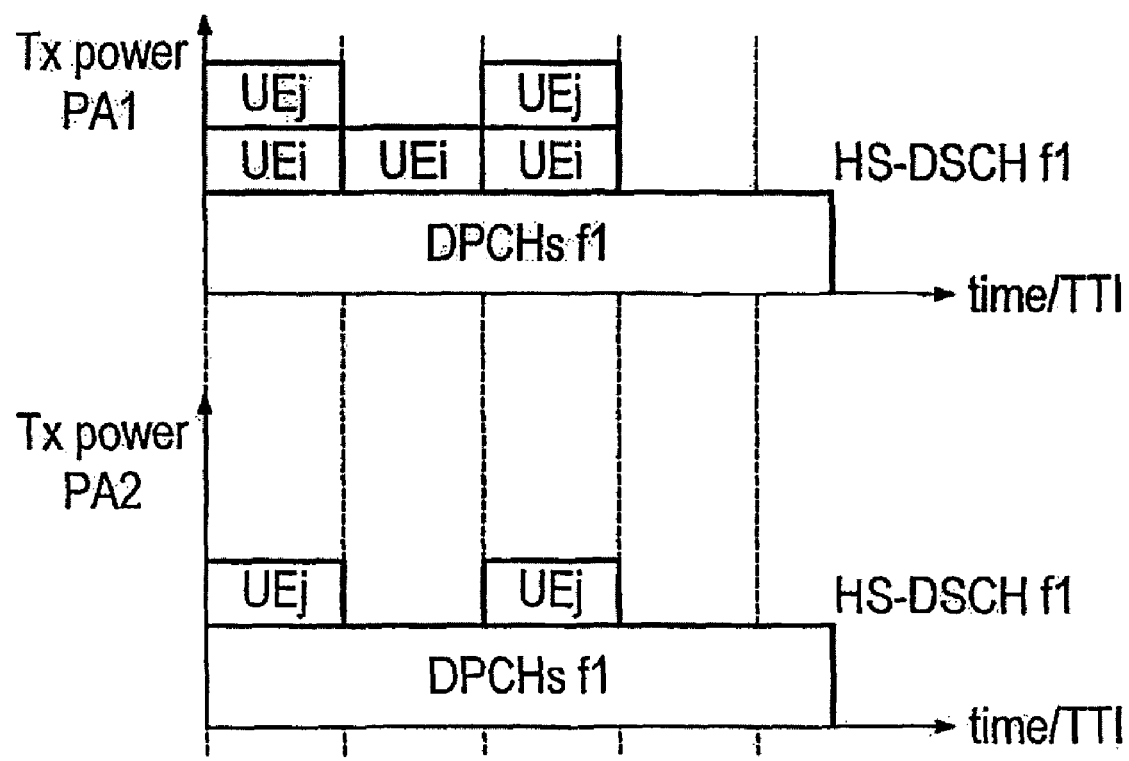
FIG. 12 is illustrative of is illustrative of the statistical utilisation of the transmission power capacities of the dual carrier power amplifiers of the system of FIG. 11.

FIG. 12 shows the corresponding time domain characteristic. It is to be noted that none of the above described embodiments is restricted to 2-transmit diversity. Rather n-transmit diversity can be implemented, where n can be any number above 2.

LIST OF REFERENCE NUMERALS 1 transmitter
3 transmit diversity module
5 adder
7 adder
9 power amplifier
11 antenna
13 power amplifier
15 antenna
17 code multiplexer
19 scheduler
20 diagram
22 diagram
100 transmitter
102 transmitter diversity module
104 transmitter diversity module
106 adder
108 adder
110 power amplifier
112 power amplifier
114 antenna
116 antenna
118 code multiplexer
120 code multiplexer
122 transmit diversity module
124 scheduler
200 diagram
202 diagram

The invention claimed is:

1. A method of sending first and second signals to a plurality of user equipments, the method comprising:
   providing a dedicated channel for each one of the plurality of user equipments,
   providing a code-multiplexed shared channel for the plurality of user equipments,
   splitting the plurality of user equipments substantially evenly into a first group of user equipments which are assigned to a first carrier frequency and into a second group of user equipments which are assigned to a second carrier frequency,
   receiving first signals which are to be transmitted on dedicated channels being assigned to the first carrier frequency to provide two first signal components for transmit diversity;
   receiving second signals which are to be transmitted on dedicated channels being assigned to the second carrier frequency to provide two second signal components for transmit diversity;
   first code-multiplexing third signals to be sent to the first group of user equipments to provide two third signal components for multi-user diversity;
   second code-multiplexing fourth signals to be sent to the second group of user equipments to provide two fourth signal components for multi-user diversity;
   first adding one of the first signal components, one of the second signal components, one of the third signal components, and one of the fourth signal components;
   second adding the other one of the first signal components, the other one of the second signal components, the other one of the third signal components, and the other one of the fourth signal components; and
   first power-amplifying a result of the first adding to transmit the first power-amplified signal via a first antenna;
   second power-amplifying a result of the second adding to transmit the second power-amplified signal via a second antenna;
   wherein the first carrier frequency and the second carrier frequency are alternately assigned to the plurality of user equipments in an order in which the plurality of user equipments become active,
   wherein each of the first and second signals is assigned to either the first carrier frequency or to the second carrier frequency,
   wherein each of the user equipments is assigned to one of the first and second carrier frequencies and to one of the first and second antennas,
   wherein the first and second signals are real time signals and the third and fourth signals are non-real time signals, the real time signals including at least one of voice signals and video signals.

2. The method of claim 1, wherein the dedicated channel is a DPCH type channel and the code-multiplexed shared channel is a HS-DSCH type channel of a HSDPA type system.

3. The method of claim 1, further comprising:
   assigning a carrier frequency of a set of at least first and second carrier frequencies to each one of the dedicated channels,
   assigning a carrier frequency of the set of carrier frequencies to each one of the plurality of user equipments.

4. The method of claim 3, further comprising applying transmit diversity for sending of the one of the second signals.

5. The method of claim 4, wherein closed loop transmit diversity is applied for the third and fourth signals on a predetermined channel condition.

6. A non-transitory computer readable recording medium having tangibly stored thereon a computer program for enabling a computer to control a sending of first and second signals to a plurality of user equipments, the program comprising:
   providing a dedicated channel for each one of the plurality of user equipments,
   providing a code-multiplexed shared channel for the plurality of user equipments,
   splitting the plurality of user equipments substantially evenly into a first group of user equipments which are assigned to a first carrier frequency and into a second group of user equipments which are assigned to a second carrier frequency
   receiving first signals which are to be transmitted on dedicated channels being assigned to the first carrier frequency to provide two first signal components for transmit diversity;
   receiving second signals which are to be transmitted on the dedicated channels being assigned to the second carrier frequency to provide two second signal components for transmit diversity;
   first code-multiplexing third signals to be sent to the first group of user equipments to provide two third signal components for multi-user diversity;
   second code-multiplexing fourth signal to be sent to the second group of user equipments to provide two fourth signal components for multi-user diversity;

first adding one of the first signal components, one of the second signal components, one of the third signal components, and one of the fourth signal components;

second adding the other one of the first signal components, the other one of the second signal components, the other one of the third signal components, and the other one of the fourth signal components; and first power-amplifying a result of the first adding to transmit the first power-amplified signal via a first antenna;

second power-amplifying a result of the second adding to transmit the second power-amplified signal via a second antenna;

wherein the first carrier frequency and the second carrier frequency are alternately assigned to the plurality of user equipments in an order in which the plurality of user equipments become active, wherein each of the first and second signals is assigned to either the first carrier frequency or to the second carrier frequency, wherein each of the user equipments is assigned to one of the first and second carrier frequencies and to one of the first and second antennas, wherein the first and second signals are real time signals and the third and fourth signals are non-real time signals, the real time signals including at least one of voice signals and video signals.

7. A transmitter which sends first and second signals to a plurality of user equipments, the transmitter comprising:

a first component which provides a dedicated channel for each one of the plurality of user equipments, a second component which provides a code-multiplexed shared channel to the plurality of user equipments, a third component which splits the plurality of user equipments substantially evenly into a first group of user equipments which are assigned to a first carrier frequency and into a second group of user equipments which are assigned to a second carrier frequency, a fourth component which receives first signals which are to be transmitted on dedicated channels being assigned to the first carrier frequency to provide two first signal components for transmit diversity;

a fifth component which receives second signals which are to be transmitted on the dedicated channels being assigned to the second carrier frequency to provide two second signal components for transmit diversity;

a sixth component which code-multiplexes third signals to be sent to the first group of user equipments to provide two third signal components for multi-user diversity;

a seventh component which code-multiplexes fourth signals to be sent to the second group of user equipments to provide two fourth signal components for multi-user diversity;

an eighth component which adds one of the first signal components, one of the second signal components, one of the third signal components, and one of the fourth signal components;

a ninth component which adds the other one of the first signal components, the other one of the second signal components, the other one of the third signal components, and the other one of the fourth signal components;

a tenth component which power-amplifies an adding result of the eighth component to transmit the first power-amplified signal via a first antenna; and an eleventh component which power-amplifies an adding result of the ninth component to transmit the second power-amplified signal via a second antenna, wherein the first carrier frequency and the second carrier frequency are alternately assigned to the plurality of user equipments in an order in which the plurality of user equipments become active, wherein each of the first and second signals is assigned to either the first carrier frequency or to the second carrier frequency, wherein each of the user equipments is assigned to one of the first and second carrier frequencies and to one of the first and second antennas, wherein the first and second signals are real time signals and the third and fourth signals are non-real time signals, the real time signals including at least one of voice signals and video signals.

8. The transmitter of claim 7, further comprising scheduler which provides the multi-user diversity.

9. The transmitter of claim 7, further comprising:

means for assigning a carrier frequency of a set of at least first and second carrier frequencies to each one of the dedicated channels, means for assigning of a carrier frequency of a set of carrier frequencies to each one of the user equipments.

10. A telecommunication system for sending first and second signals to a plurality of user equipments, the telecommunication system comprising:

a first component which provides a dedicated channel for each one of the plurality of user equipments, a second component which provides a code-multiplexed shared channel for the plurality of user equipments, a third component which splits the plurality of user equipments substantially evenly into a first group of user equipments which are assigned to a first carrier frequency and into a second group of user equipments which are assigned to a second carrier frequency, a fourth component which receives first signals which are to be transmitted on dedicated channels being assigned to the first carrier frequency to provide two first signal components for transmit diversity;

a fifth component which receives second signals which are to be transmitted on the dedicated channels being assigned to the second carrier frequency to provide two second signal components for transmit diversity;

a sixth component which code-multiplexes third signals to be sent to the first group of user equipments to provide two third signal components for multi-user diversity;

a seventh component which code-multiplexes fourth signals to be sent to the second group of user equipments to provide two fourth signal components for multi-user diversity;

an eighth component which adds one of the first signal components, one of the second signal components, one of the third signal components, and one of the fourth signal components;

a ninth component which adds the other one of the first signal components, the other one of the second signal components, the other one of the third signal components, and the other one of the fourth signal components;

a tenth component which power-amplifies an adding result of the eighth component to transmit the first power-amplified signal via a first antenna; and an eleventh component which power-amplifies an adding result of the ninth component to transmit the second power-amplified signal via a second antenna wherein the first carrier frequency and the second carrier frequency are alternately assigned to the plurality of user equipments in an order in which the plurality of user equipments become active, wherein each of the first and second signals is assigned to either the first carrier frequency or to the second carrier frequency, wherein each of the user equipments is assigned to one of the first and second carrier frequencies and to one of the first and second antennas, wherein the first and second signals are real time signals and the third and fourth signals are non-real time signals, the real time signals including at least one of voice signals and video signals.

* * * * *